US007426585B1

(12) United States Patent
Rourke

(10) Patent No.: US 7,426,585 B1
(45) Date of Patent: Sep. 16, 2008

(54) SMART CABLES

(75) Inventor: Michael C. Rourke, Groton, MA (US)

(73) Assignee: Quartet Technology, Inc., Dracut, MA (US)

( * ) Notice: Subject to any disclaimer, the term of this patent is extended or adjusted under 35 U.S.C. 154(b) by 454 days.

(21) Appl. No.: 10/762,896

(22) Filed: Jan. 22, 2004

(51) Int. Cl.
*G06F 3/00* (2006.01)
*G06F 13/00* (2006.01)
(52) U.S. Cl. .......................... 710/8; 710/313
(58) Field of Classification Search ............... 710/8, 710/313
See application file for complete search history.

(56) References Cited

U.S. PATENT DOCUMENTS

| 5,297,183 | A | * | 3/1994 | Bareis et al. ............... 455/410 |
| 6,054,846 | A | * | 4/2000 | Castleman .................. 323/283 |
| 6,081,782 | A | * | 6/2000 | Rabin ......................... 704/275 |
| 6,131,125 | A | * | 10/2000 | Rostoker et al. ........... 709/250 |
| 2002/0013710 | A1 | * | 1/2002 | Shimakawa ................ 704/275 |
| 2002/0059068 | A1 | * | 5/2002 | Rose et al. .................. 704/246 |
| 2002/0136038 | A1 | * | 9/2002 | Spitaels et al. ............... 363/95 |

* cited by examiner

*Primary Examiner*—Tariq Hafiz
*Assistant Examiner*—Scott Sun
(74) *Attorney, Agent, or Firm*—David A. Dagg

(57) ABSTRACT

A system for connecting an I/O device to a central system including a cable connector having a memory for storing configuration information such as the type of the I/O device, characteristics of the I/O device, and/or the identity or characteristics of a user associated with the I/O device. Multiple universal slots are each capable of accepting the disclosed cable connector. When the disclosed connector is inserted into one of the slots, the central system operates to automatically detect the presence of the associated I/O device, and to read configuration information from the memory in the connector into memory within the central system. Configuration information read from the connector is used to configure the central system. The central system may use the configuration information from the connector memory to direct data and/or signals between the multiple universal slots and separate internal logic blocks associated with different types of I/O devices. User specific configuration information read by the central system from the connector memory may be used to configure user specific functions, such as, for example, speech recognition. The central system may further write various types of configuration information to the memory in the cable connector. Such information may include user specific characteristics determined during operation of the device, such as user specific speech characteristics.

23 Claims, 5 Drawing Sheets

SMART CABLES

FIELD OF THE INVENTION

The present invention relates generally to interconnecting input/output (I/O) devices to a central system, and more specifically to an intelligent cable design and interface system providing automatic device detection, identification, and system configuration.

BACKGROUND OF THE INVENTION

Many types of input/output (I/O) devices are connected to central systems through cables. In the case of an input device, the cable carries data from the device to the central system. For output devices, the cable passes data from the central system to the device. Additionally, cables may be used to convey data both to and from a central system in the case of cables for connecting transceiver devices. Various specific cable connector designs (sometimes referred to as "plugs") exist for plugging cables into a central system. Specific cable connector designs are often incompatible with each other, requiring a central system to include different types of slots (sometimes referred to as "receptacles" or "jacks"), so that different I/O devices can be connected. As a result, when a person must connect a number of I/O devices to a central system, that person may be faced with multiple different slots for inserting one or more cable connectors. For many users, the task of correctly connecting one or more I/O devices to the central system can be confusing and difficult. If a given cable is not correctly connected to the appropriate input slot, the associated I/O device will not function as it is intended within the overall system. In some cases, improper connection of a cable for an I/O device may result in damage to the central system, or to the I/O device. In particular, when a system is designed for use by a disabled person, correctly interconnecting even a single I/O device to a central system having multiple, dissimilar cable slots can present a significant challenge.

It is also often necessary to configure a central system to reflect which specific I/O devices are connected to it. In a given operational environment, where some number of I/O devices are present, the central system must determine which slots are being used, as well as the types of the I/O devices that are connected to those slots. This information is needed so that the central system can correctly operate with the I/O devices that are connected to it, in terms of data formats and protocols with respect to specific slots. Moreover, the central system may also need configuration information reflecting characteristics of the specific user that is interfacing through a given I/O device or devices. Such user-specific configuration information may be relevant, for example, in performing user-specific processing by the central system, such as speech recognition.

In the context of system maintenance and support, it is further helpful to be able to be able to conveniently determine, for example from a remote management station, the types of I/O devices that are connected to specific slots in the central system. Without such information, trouble-shooting may be difficult or impossible. In addition, it may be desirable for the central system to prevent certain types of I/O devices from being connected to it, even when a connector is correctly physically connected for that device. In this way, the device manufacturer can control which I/O devices are permitted to be connected to the central system.

Accordingly, as set forth above, it would be desirable to have a new system for connecting I/O devices to a central system that enables the I/O devices to be connected to any slot in any order provided by the central system. The system should enable the central system to automatically determine the presence of an I/O device connected to one of the slots in the central system, automatically determine the type of the I/O device connected to the slot, and automatically determine characteristics of a user, without the need for explicit configuration of the central system by the user in this regard. The system should further be capable of passing on the automatically determined configuration information regarding the I/O devices and/or the user to a technician or maintenance engineer for support and troubleshooting of the system.

SUMMARY OF THE INVENTION

A method and system for connecting an I/O device to a central system are disclosed, including a cable connector having a memory for storing information describing the type of I/O device, characteristics of the I/O device, and/or the identity or characteristics of a user associated with the I/O device. The disclosed system includes multiple universal slots, each of which is capable of accepting one of the disclosed cable connectors. When one of the disclosed connectors is inserted into one of the slots in the central system, the central system operates to automatically detect the presence of the associated I/O device, and to read configuration information from the memory in the connector into memory within the central system. The configuration information read from the connector is then used to configure the central system. In one embodiment, the central system uses the configuration information it reads from the connector memory to configure an internal switching circuit that directs data and/or signals between the multiple universal slots and separate internal logic blocks associated with different types of processing. User specific configuration information read by the central system from the connector memory may be used to configure user specific functions, such as, for example, speech recognition.

The central system may further write information to the memory in the cable connector. Such information may include user specific characteristics determined during operation of the device, such as user specific speech characteristics. Other user specific information may be written to and/or read from the connector memory that may affect the operation of the central system with respect to the I/O device connected by that cable, or operation of the central system with respect to some other I/O device. The configuration information stored within the connector memory is maintained when the connector and associated I/O device are removed from the system, and accordingly can be used subsequently when the connector is re-inserted into the same, or a different, central system.

Thus there is disclosed a new system for connecting an I/O device through a cable to a central system that enables different I/O devices to be connected to any slot provided by the central system. The disclosed system further enables the central system to automatically determine the presence of an I/O device connected to one of the slots in the central system, automatically determine the type of the I/O device connected to the slot, and automatically determine the identity and/or characteristics of a user associated with an I/O device. The configuration information regarding the I/O devices, as well as the user identification and/or user characteristics, are obtained without the need for a user or technician to explicitly enter such configuration information into the central system in a separate step. The disclosed system is further capable of passing the automatically determined configuration information regarding the I/O devices and/or the user to a technician or maintenance engineer for support and troubleshooting.

BRIEF DESCRIPTION OF THE DRAWINGS

The invention will be more fully understood by reference to the following detailed description of the invention in conjunction with the drawings, of which.

DETAILED DESCRIPTION OF THE PREFERRED EMBODIMENTS

Figure 1:
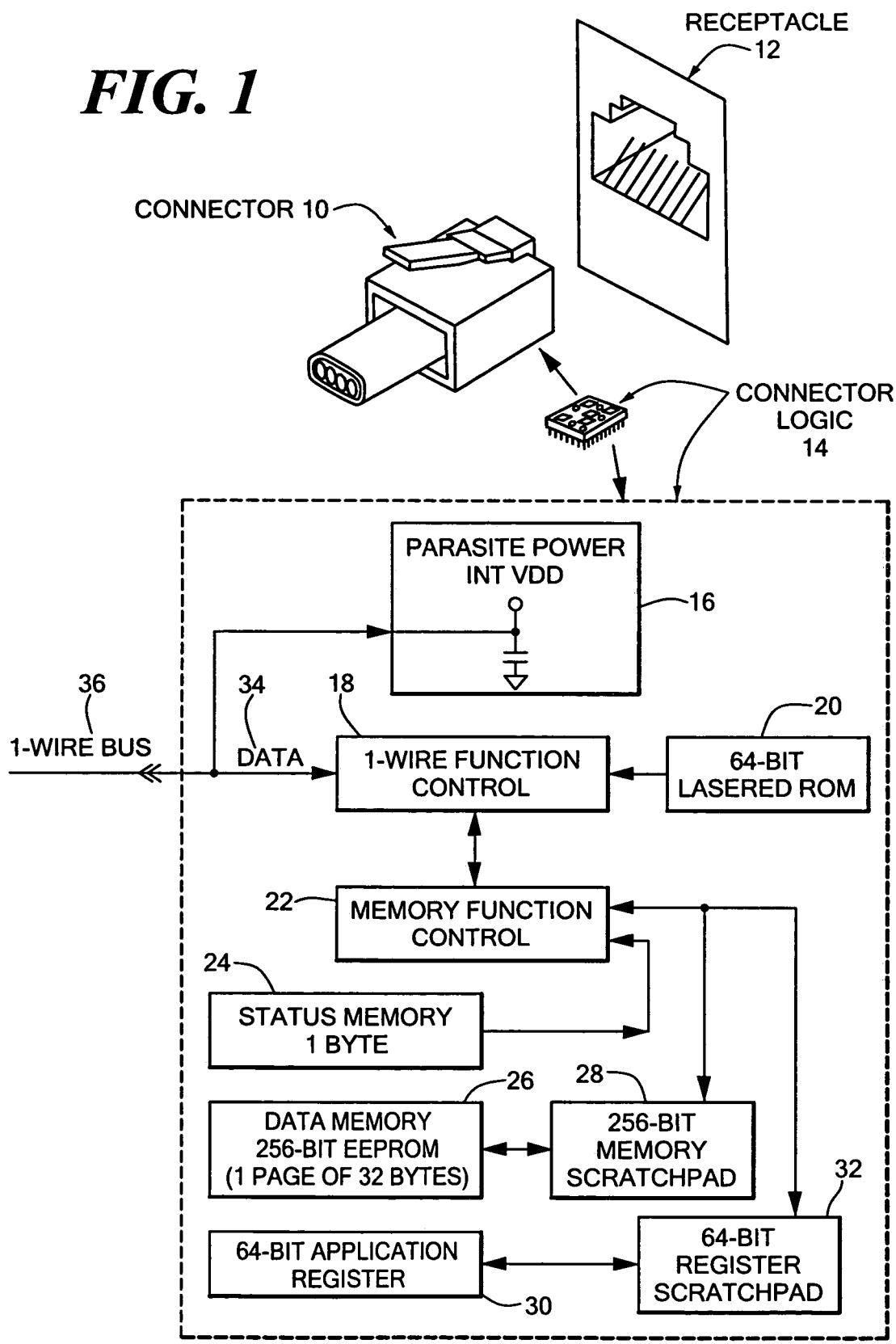
FIG. 1 is a block diagram showing an illustrative embodiment of a cable connector in the disclosed system.

As shown in FIG. 1, an embodiment of the disclosed system includes a connector 10 for insertion into a receptacle 12. The connector 10 may, for example, consist of an eight pin modular jack, such as what is generally referred to as an RJ-45 connector, or other specific type of connector. Similarly, the receptacle 12 may consist of an 8 pin modular receptacle, or other suitable receptacle.

The connector 10 includes connector logic 14. One possible structure of the connector logic is illustrated in further detail by components 16, 18, 20, 22, 24, 26, 28, 30 and 32 in FIG. 1. The illustrative structure of the embodiment of the connector logic 14 of FIG. 1 may, for example, use a DS2430A 256-Bit 1-wire EEPROM, as provided by Dallas Semiconductor.

As shown in FIG. 1, the connector logic may include an internal power component operable to take power off of the same line that is used to convey data 34, such as digital data, and shown as the 1-wire bus 36 in FIG. 1. In an embodiment using an RJ-45 connector, the 1-wire bus 36 may, for example, be coupled with two of the eight connector pins, one for a bi-directional digital signal and one for receiving power. Other lines available in the connector 10 are thus available for any other potential purpose. Such other pins may be used to convey various types of signals between a device coupled to the cable terminated by the connector 10 and a central system including the receptacle 12, such as digital and/or analog signals representing audio, temperature, or other types of data. Such devices may, for example, include microphones, speakers, temperature probes, devices coupled through RS-232 jacks, or other specific types of devices.

The 1-wire bus 36 is controlled by the 1-wire function control logic 18, which is coupled to the 64-bit lasered ROM (Read Only Memory) 20, which stores a unique code associated with the device coupled to the cable terminated by the connector 10. Upon insertion into the receptacle 12, the central system confirms that the device is one that can validly be connected to the central system. For example, the unique code may include a field storing a predetermined value associated with the manufacturer of the central system. If this value is confirmed to be stored in the field of the unique code, then the device is one that can validly be connected to the central system. Otherwise, the central system may indicate that that the device should not be connected to the central system, for example by providing an error indication of some type. If the device is determined to be valid for connection to the central system, then the central system may further operate to store the unique code internally, for subsequent access during maintenance operations.

The memory function control logic 22 controls access to the status memory 24, data memory 26, memory scratchpad 28, application register 30, and scratchpad register 32. In the disclosed system, the memory scratchpad 28, application register 30, and/or register scratchpad 32 may be used to store one or more values describing the type and/or characteristics of a device coupled to the cable, and/or characteristics of a user of the device. Such values may, for example, describe an amount of gain needed to apply to a signal conveyed by the cable for a particular device or user, potentially reflecting how loud a user speaks. The data memory 26 is a persistent store for data that may be loaded into the memory scratchpad 28, application register 30, and/or register scratchpad 32 on power-up when the connector 10 is inserted into the receptacle 12, and/or stored from the memory scratchpad 28, application register 30, and/or register scratchpad 32 upon power-down when the connector 10 is removed from the receptacle 12. Accordingly, the central system may, for example, operate to read values indicating the type and/or characteristics of the device coupled to the cable, and/or characteristics of the device coupled to the cable, and/or characteristics of the user of the device, from the memory scratchpad 28 that are persistently stored in the data memory 26. In the event that the central system needs to modify a value that is to be persistently stored, such a modified value may be stored by the central device into the persistent data memory 26.

Figure 2:
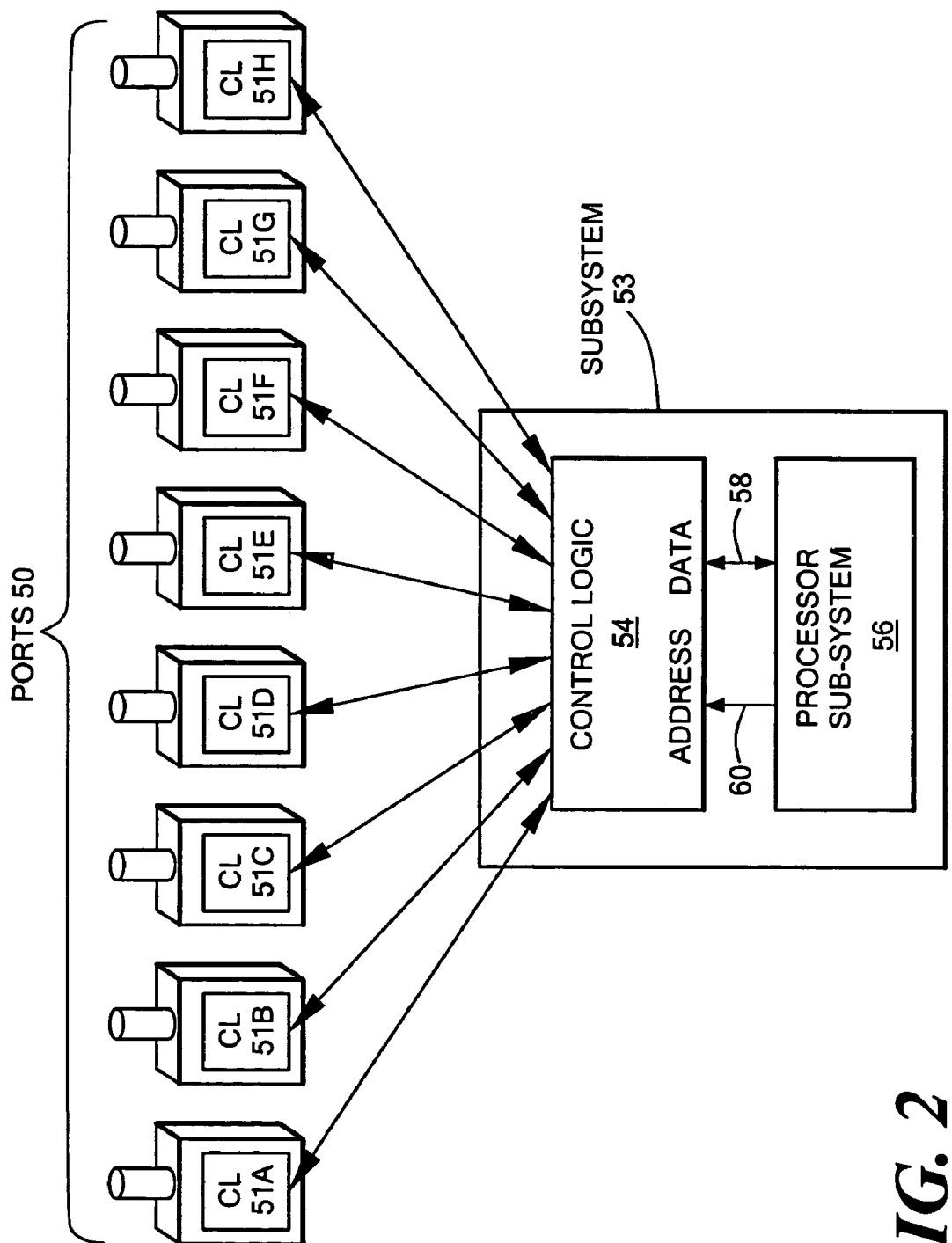
FIG. 2 is a block diagram showing an illustrative embodiment of a central system in the disclosed system.

As shown in the illustrative embodiment of FIG. 2, a number of receptacles, shown as the ports 50, having the disclosed connectors inserted therein. Each of the connectors inserted into the ports 50 in FIG. 2 include connector logic, shown as CL 51A, 51B, 51C, 51D, 51E, 51F, 51G and 51H. The ports 50 are communicably coupled to control logic 54, which operates to read data stored in the control logic of the connectors inserted into the ports 50, and make the data available to a processor subsystem 56, which is coupled to the control logic 54 by address lines 60 and data lines 58. The data read from the connector logic in the connectors inserted into the ports 50 may be made available to the processor subsystem 56 through one or more registers in the control logic 54. In response to the values read from the connector logic of the connectors inserted into the ports 50, the processor subsystem 56 programs the control logic 54 to determine how signals from the ports 50 are switched within the subsystem 53. While eight ports are shown in FIG. 2, the present system is not so limited, and any number of ports my be used. Similarly, while FIG. 2 shows a configuration in which there are connectors present in each of the ports 50, the present system is operable when any number of connectors are inserted into the port receptacles.

The control logic 54 may, for example, consist of a Field Programmable Gate Array (FPGA), or any other suitable type of logic circuit. The control logic 54 provides the ability to control the switching of each line from each of the ports 50 to any specific processing logic, based on program code executing in the processor subsystem 56, which may include one or more processors and associated program code memory for storage of such program code. For example, a table may be used to indicate where the signals coming from the ports 50 are to be switched. The control logic 54 can be designed to handle any specific characteristic of an input or output device coupled to a cable having a connector inserted into one of the ports 50, as well as specific characteristics of users of such input or output devices.

Figure 3:
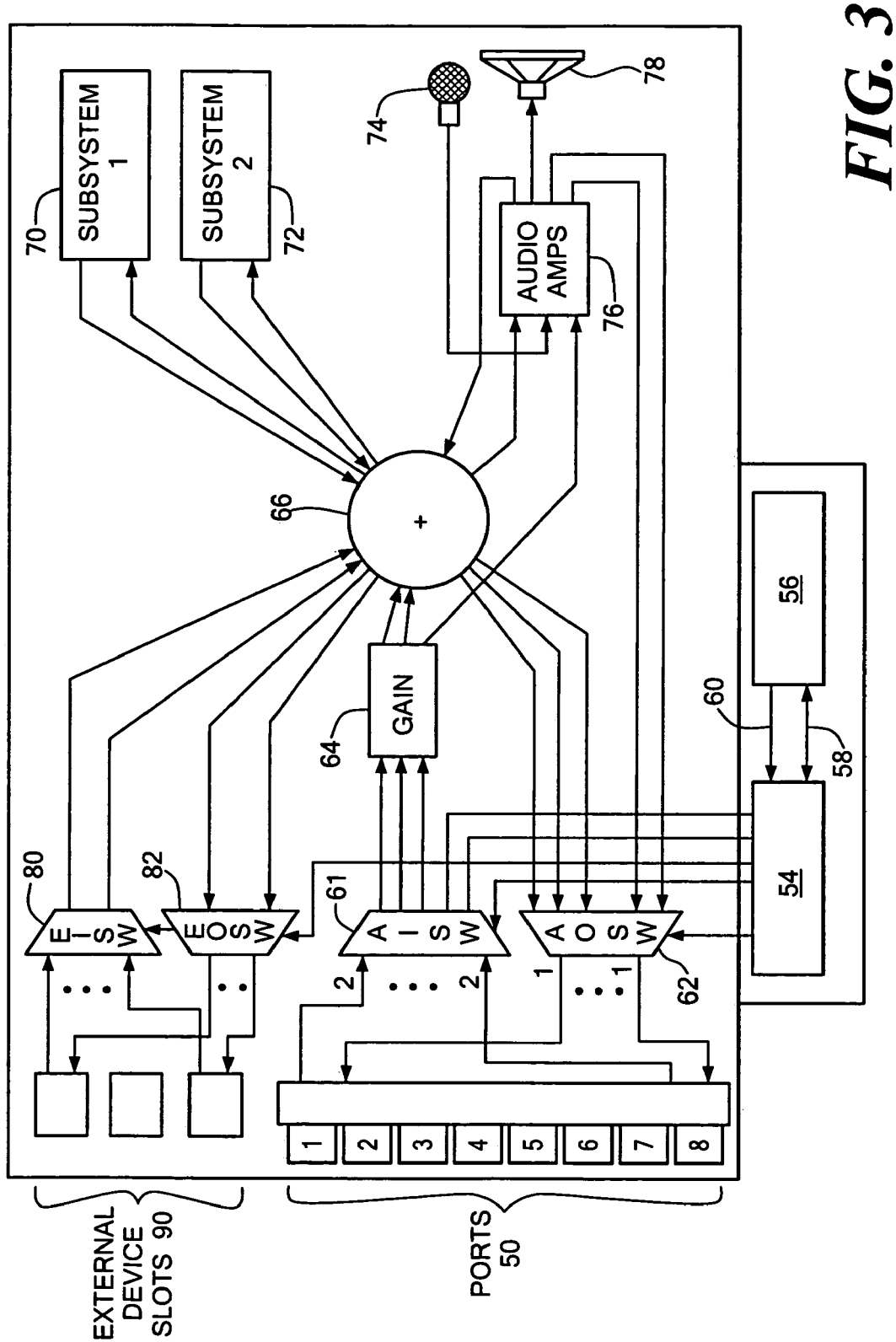
FIG. 3 is a block diagram further illustrating an embodiment of a central system in the disclosed system.

FIG. 3 shows an embodiment of the disclosed system including control logic 54 and processor subsystem 56 coupled by address lines 60 and data lines 58. The control logic 54 is further coupled to receive data signals from ports 50, and to control selection and forwarding of signals passed through the audio output switch (AOSW) 62, audio input switch (AISW) 61, external device input switch (EISW) 80, and external device output switch (EOSW) 82. The control logic 54 is, in turn, controlled through program code executing on the subsystem 56.

During operation of the embodiment shown in FIG. 3, data stored in the connector logic of connectors inserted into one or more of the ports 50 is passed through to the control logic 54, and accessed by the processor subsystem 56. In response to the data from the connector logic, the program code executing in the processor subsystem determines how signals of the ports 50 are to be conveyed. For example, one or more signals from the ports 50 may be passed through the AISW 61 to one or more initial processing circuits, shown for purposes of illustration as the gain circuit 64. Depending on which line is used to pass the signal to the gain circuit 64, the gain circuit applies some predetermined amount of gain to the signal. The predetermined amount of gain may be positive, negative, or zero. Other initial processing performed on the signals passed through the AISW 61 may include digital to analog conversion, or other specific types of signal processing. The initial processing circuit or circuits, such as the gain circuit 64, pass the resulting signal to the summing circuit 66, which allows access of the result to other processing circuits, shown for purposes of illustration as the audio amps 76 for forwarding to the speaker 78. The summing circuit 66 further provides access to the signals it receives to subsystem 1 70 and subsystem 2 72. The subsystems 1 70 and 2 72 may include any specific type of processing for the signals received from the ports 50, which may or may not have been passed through one or more initial processing circuits. For example, the subsystems 1 70 and 2 72 may include voice recognition processing, and other types of processing involving audio inputs and/or audio outputs. The summing circuit 66 in the embodiment of FIG. 3 further provides access to the signals it receives to EISW 80 and EOSW 82, which determine how signals are conveyed to and from some number of devices inserted into the external device slots 90. Such external devices may, for example, include one or more speakerphones, or any other specific types of input/output or signal processing devices.

Signals received from the microphone 74, the subsystems 1 70 and 2 72, and the devices coupled to the external device slots 90 are forwarded to the summing circuit 66, and the specific lines of the ports 50 to which the outputs of the summing circuit are forwarded are determined by the control logic 54, as indicated by the program code executing in the processor subsystem 56, in response to the data read from the connector logic in connectors inserted into the ports 50. The control logic 54 controls the AOSW 62 in the embodiment shown in FIG. 3 to determine which signals from the central system are forwarded to which specific lines within the ports 50.

Figure 4:
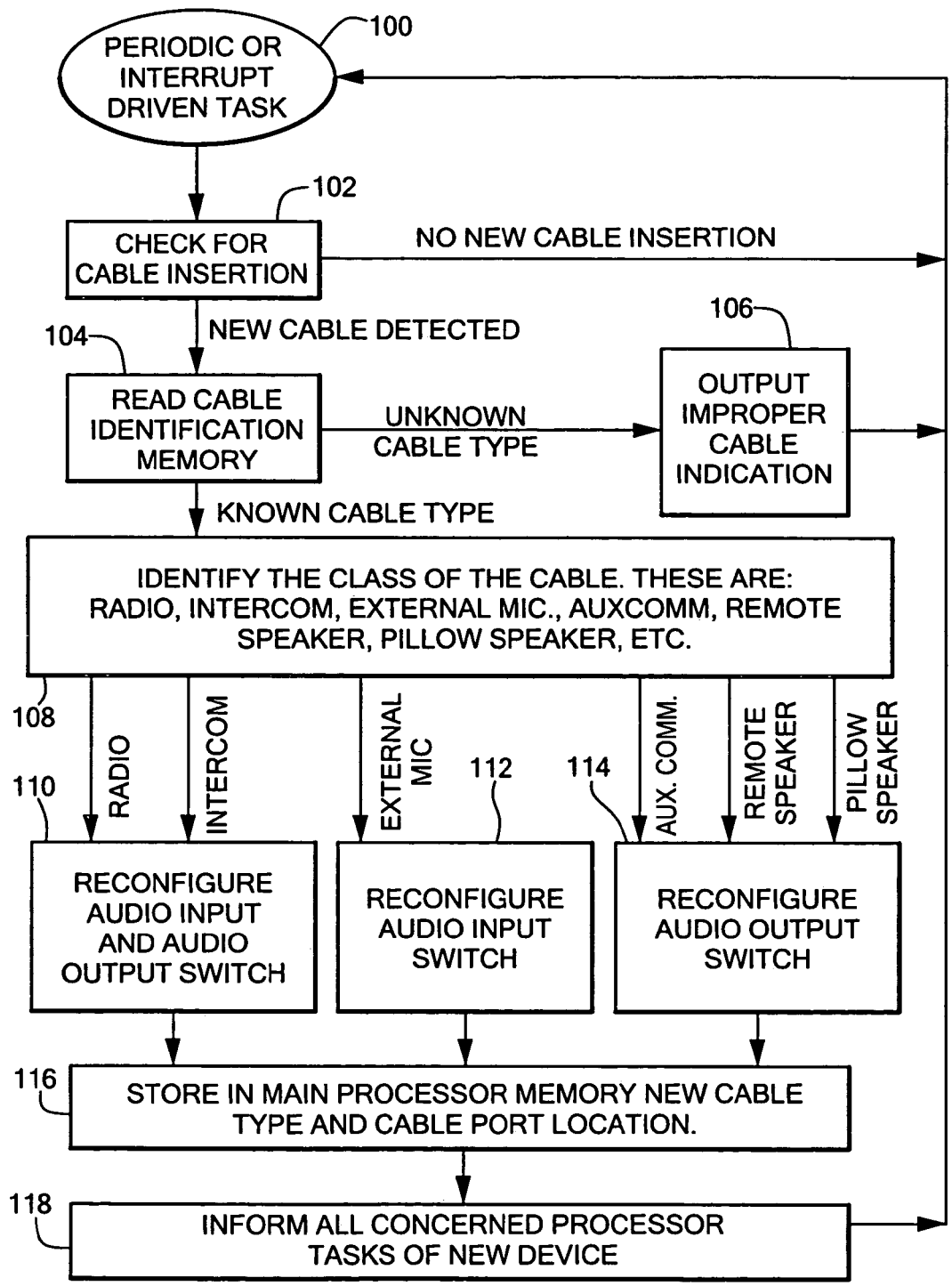
FIG. 4 is a flow chart of steps performed in an illustrative embodiment to perform inserted cable detection.

FIG. 4 is a flow chart showing steps performed by an exemplary embodiment of the disclosed system to detect and process information from an inserted cable connector. The steps of FIG. 4 may, for example, be performed by program code executing in the processor subsystem 56. As shown in FIG. 4, at step 100, the disclosed system invokes a task periodically, or in response to an interrupt issued when a new cable is inserted, to check at step 102 for an inserted cable connector. If a new cable connector is detected, at step 104 the disclosed system reads data from within the connector logic memory of the cable connector at step 104. If the data read from the connector logic does not map to a known type of cable or device type, then at step 106 an improper cable indication is presented, for example by output of an audio file through a speaker, informing the user that an invalid cable has been inserted. Otherwise, if the data read from the connector logic of the newly inserted cable is recognized, then at step 108 the disclosed system operates to determine a device or cable class of cable indicated by the data. The class determined at step 108 is one of a set of classes that are predetermined to organize the permitted devices that may be connected to the system based on the shared characteristics of devices in each specific class. For example, the cable classes may consist of: Radio, Intercom, External Mic, AuxComm, Remote Speaker, Pillow Speaker, etc. The preceding classes of devices or cables are provided for purposes of explanation only, and the disclosed system may be embodied to operate based on any suitable set of classes for given embodiment.

In the event that the cable class is determined to be Radio or Intercom, at step 110 the disclosed system reconfigures the audio output switch to direct one or more lines from the newly connected port appropriately to process received Radio or Intercom signals. If the cable class is determined to be External Mic, the disclosed system reconfigures the audio input switch to direct one or more lines from the newly connected port appropriate to process received signals from an External Microphone. Similarly, in the event that the cable class is determined to be AuxComm, Remote Speaker, or Pillow Speaker, the disclosed system operates to reconfigure the audio output switch to direct one or more lines from the central system, for example from a summing circuit 66 as shown in FIG. 3, to one or more lines of the newly connected port. At step 116, the disclosed system stores a record of the newly inserted cable type and the port in which it was detected, for example into a memory within the processor subsystem. At step 118, the disclosed system operates to inform some number of concerned processor tasks of the insertion of the new cable connector, for example connecting an audio device to the central system.

The information regarding currently connected devices and user identification and/or characteristics may be made available to computer program processes that provide such information to external users or systems, for example through the ports 50, the external device slots 90, or other interfaces, for purposes of maintenance and support. Moreover, the user specific characteristics and/or identification data obtained from the connector logic may be stored and subsequently accessed when the same cable is subsequently connected.

Figure 5:
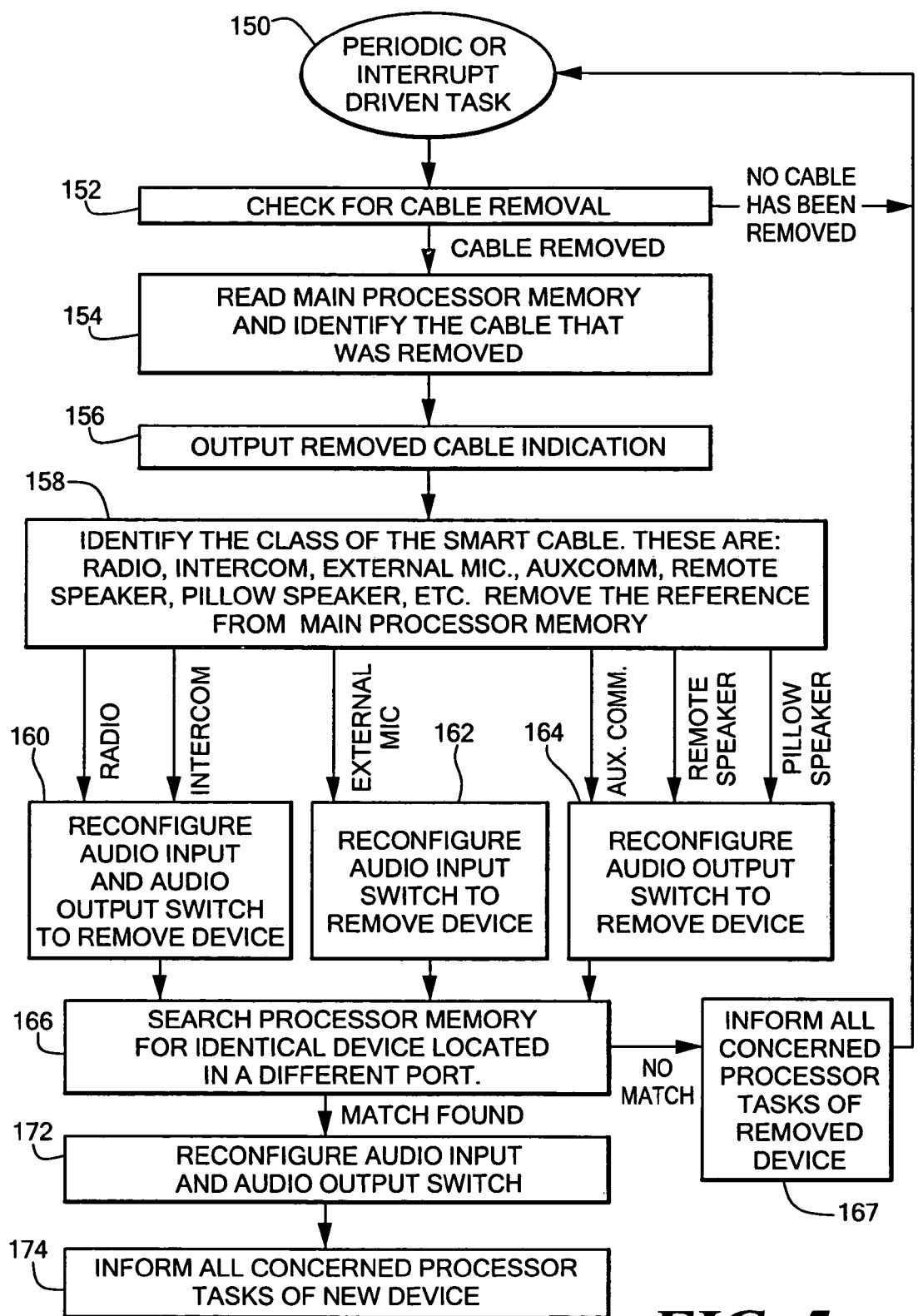
FIG. 5 is a flow chart of steps performed in an illustrative embodiment in response to removal of a cable.

FIG. 5 shows steps performed in an embodiment of the disclosed system to detect and respond to removal of one of the disclosed connectors. The steps of FIG. 5 may, for example, be performed by program code executing in the processor subsystem 56. As shown in FIG. 5, at step 150, the disclosed system invokes a task periodically, or in response to an interrupt issued when a connector is removed, to check at step 152 for a removed cable connector. In the event that a cable has been removed, at step 154 the disclosed system determines which specific type of device has been removed from which specific port by checking a main processor memory. At step 156, a removed cable indication is output to the user. For example, at step 156, an indication of the type of cable or device that was removed, and the port that it was connected to, is presented to the user by playing of an audio file through a speaker.

At step 158 the disclosed system operates to determine the class of the removed device or cable. For example, if the removed device was a Radio or Intercom class device, then at step 160, the disclosed system reconfigures the audio input and audio output switches to remove the device. In the event that the removed device was an external microphone class device, then at step 162 the audio input switch is reconfigured to remove the device. Similarly, if the removed device was an auxiliary communication, remote speaker, or pillow speaker class device, the audio output switch is reconfigured to remove the device. At step 166, the disclosed system searches processor memory for indication that an identical device has been connected to another port. If so, then at step 172 the audio input and audio output switches are reconfigured to reflect the new port to which the device has been connected. At step 174, the disclosed system informs all potentially concerned program processes regarding the new port into which the device has been connected. If no match is found at step 166, then at step 167 the disclosed system informs all concerned processor tasks of the removed device.

The disclosed system may be embodied to handle the characteristics of any specific type of input or output device, and/or various user characteristics. Signals may be routed to various components in a central system for processing, for example to increase or decrease the signal gain, route the signal to a telephone, route the signal to a speech subsystem that records audio, such as a fixed number of phrases that can be triggered by actions performed through one or more other input devices plugged into the central system. Moreover, the data stored in disclosed cable connector may represent digital or analog values. Accordingly, while the illustrative embodiments have described the routing of signals within an audio signal processing system or subsystem, the disclosed system is not limited to such applications. The devices and signals associated with the disclosed cables, connectors, and central system processing, may include any specific type of device or signal, including analog and digital signals, and devices related to audio, video, or other types of data.

The disclosed system may be embodied such that the central system is operable to initialize an uninitialized connector logic of a cable inserted into one of the receptacles of the central unit. During such operation, the cable including the uninitialized connector logic would not be recognized by the central system. Instead, the central system would write data over the 1-wire bus 36 of FIG. 1 to be stored in the uninitialized connector logic, for example in the persistent data memory 26 of the uninitialized connector logic. Data loaded into the uninitialized connector logic may be provided to the central system from an external device coupled to the central system, for example through an external device slot or other interface of the central system. Such an external device might be a computer system, such as a personal computer or laptop computer system, a personal digital assistant (PDA), or any other specific type of external device from which data may be obtained. The data written into the uninitialized connector logic in this way provides information describing a device to be connected to a central system through the cable, including the type of the device, and any number of characteristics of the device relevant to operation of the device with the central system.

Those skilled in the art will recognize that the specific order of the steps shown in FIGS. 4 and 5 are provided purely for purposes of illustration, and that the operations described in connection with the steps shown in FIGS. 4 and 5 may be performed in various specific orders as appropriate for various embodiments and/or deployments of the disclosed system.

FIGS. 4-5 are flowchart illustrations of methods and apparatus (systems) that may be embodied using software and/or hardware logic components. It will be understood that each block of the illustrations, and combinations of blocks in the illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the illustrative block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks within each figure. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the figures. Alternatively, the functions necessary to implement the invention may be embodied in part or in whole using hardware logic components such as Application Specific Integrated Circuits or any other specific types of hardware circuits, or some combination of hardware components and software. Accordingly, the steps of the flowcharts in FIGS. 4-5 may be implemented in whole or in part using such hardware logic.

Those skilled in the art should readily appreciate that programs defining the functions of the present invention can be delivered to a computer in many forms, including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem or radio links.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

What is claimed is:

1. A method of connecting a device to a central system, comprising:

detecting the insertion of a cable connector into a slot in said central system, wherein said cable connector is integral to a cable that is terminated by said cable connector, wherein said cable is communicably connected to said device at an opposite end of a cable from said cable connector;

reading, through said slot, configuration information stored in a memory contained within said cable connector, wherein said configuration information includes a value describing a type of said device;

configuring said central system in response to said configuration information read from said memory contained within said cable connector;

modifying, by said central system, said value describing said type of said device; and writing said modified value describing said type of said device from said central system through said slot, wherein said writing causes said modified value describing said type of said device to be stored into said memory contained within said cable connector.

2. The method of claim 1, wherein said configuration information further includes information describing at least one characteristic of a user of said device.

3. The method of claim 1, further comprising writing, by said central system, said at least one characteristic of said user into said memory contained within said cable connector.

4. The method of claim 1, wherein said slot is one of a plurality of slots in said central system, and wherein said configuring comprises establishing a communication path between said slot and logic within said central system associated with said device.

5. The method of claim 2, wherein said at least one characteristic of said user of said device comprises an identity of said user, wherein said configuring includes accessing at least one other characteristic of said user of said device in response to said identity of said user, and wherein said at least one other characteristic of said user is stored within and accessed from a memory in said central system.

6. The method of claim 2, wherein said configuring comprises configuring a speech recognition process within said central system in response to said at least one characteristic of said user.

7. The method of claim 6, wherein said device is a microphone.

8. The method of claim 1, wherein said device is an input device.

9. The method of claim 1, wherein said device is an output device.

10. The method of claim 1, further comprising providing said configuration information to a maintenance interface of said central system separate from said slot.

11. A system for interfacing a central system to a device, comprising:

detection circuitry for detecting the insertion of a cable connector into a slot in said central system, wherein said cable connector is integral to a cable that is terminated by said cable connector, wherein said cable is communicably connected to said device at an opposite end of a cable from said cable connector;

configuration information reading logic for reading, through said slot, configuration information stored in a memory contained within said cable connector, wherein said configuration information includes a value describing a type of said device;

configuration logic for configuring said central system in response to said configuration information read from said memory contained within said cable connector;

modification logic for modifying, by said central system, said value describing said type of said device; and modified value writing logic for writing said modified value describing said type of said device from said central system through said slot, wherein said writing causes said modified value describing said type of said device to be stored into said memory contained within said cable connector.

12. The system of claim 11, wherein said configuration information further includes information describing at least one characteristic of a user of said device.

13. The system of claim 12, further comprising configuration information writing logic for writing, by said central system, said at least one characteristic of said user into said memory contained within said cable connector.

14. The system of claim 11, wherein said slot is one of a plurality of slots in said central system, and wherein said configuring logic is further operable to establish a communication path between said slot and logic within said central system associated with said device.

15. The system of claim 12, wherein said at least one characteristic of said user of said device comprises an identity of said user, wherein said configuration logic is operable to access at least one other characteristic of said user of said device in response to said identity of said user, and wherein said at least one other characteristic of said user is stored within and accessed from a memory in said central system.

16. The system of claim 12, wherein said configuration logic is further operable to configure a speech recognition process within said central system in response to said at least one characteristic of said user.

17. The system of claim 16, wherein said device is a microphone.

18. The system of claim 11, wherein said device is an input device.

19. The system of claim 11, wherein said device is an output device.

20. The system of claim 11, further comprising maintenance logic for providing said configuration information to a maintenance interface of said central system separate from said slot.

21. A system for connecting a device to a central system, comprising:

circuitry for detecting the insertion of a cable connector into a slot in said central system, wherein said connector is integral to a cable that is terminated by said cable connector, wherein said cable is communicably connected to said device at an opposite end of a cable from said cable connector;

means for reading, through said slot, configuration information stored in a memory contained within said cable connector, wherein said configuration information includes a value describing a type of said device;

means for configuring said central system in response to said configuration information read from said memory contained within said cable connector;

means for modifying, by said central system, said value describing said type of said device; and means for writing said modified value describing said type of said device from said central system through said slot, wherein said writing causes said modified value describing said type of said device to be stored into said memory contained within said cable connector.

22. The method of claim 2, wherein said at least one characteristic of said user of said device comprises an amount of gain needed to apply to a signal conveyed by said cable, and wherein said amount of gain reflects how loud said user speaks.

23. The system of claim 12, wherein said at least one characteristic of said user of said device comprises an amount of gain needed to apply to a signal conveyed by said cable, and wherein said amount of gain reflects how loud said user speaks.

* * * * *